Patented Jan. 8, 1952

2,581,842

UNITED STATES PATENT OFFICE 2,581,842

INSECT REPELLENT

Nathan L. Drake, College Heights, Md., and Charles M. Eaker, Affton, Mo., assignors to the United States of America as represented by the Secretary of the Army No Drawing. Application January 11, 1949, Serial No. 70,395

5 Claims. (Cl. 167—22)

This invention relates to insect repellents.

We have found that the application of N,N-dipropyl levulinamide (a compound having a structural formula

to the human skin affords effective protection against insect bites, by repelling insects, particularly *Aedes aegypti* and quadrimaculatus Anopheles.

A number of tests to measure the repellency of N,N-dipropyl levulinamide against *Aedes aegypti* was conducted by smearing the compound on the arms of test personnel, who then thrust their arms into cages containing *Aedes aegypti*. The arms were exposed for 30-minute intervals at 3 minutes each until the first insect bite.

It was found that the application of N,N,-dipropyl levulinamide affords protection against *Aedes aegypti* for an average of 206 minutes. Against *Anopheles quadrimaculatus*, an average repellency time of 40 minutes was noted in analogous tests.

For ease of application to the skin, the N,N-dipropyl levulinamide may be incorporated in a suitable inert liquid or solid carrier such as mineral oil, alcohol, petrolatum, etc.

The N,N-dipropyl levulinamide may be prepared as follows:

To 44.5 g. dipropylamine in 100 ml. ether at 0° are added 27 g. levulinyl chloride in 40 ml. ether with stirring. After all the levulinyl chloride has been added the reaction mixture is allowed to stand overnight at room temperature. The reaction mixture is then poured into a saturated salt solution to dissolve the amine hydrochloride formed, and the ether solution is washed with phosphoric acid (5%) and finally with cold saturated salt solution. The ether is then removed and the amide distilled at 110–111° C. at 2 mm. pressure. The yield is 23 gms. of N,N-dipropyl levulinamide, a slightly colored water-soluble liquid boiling at 110–111° C. at 2 mm. pressure and having a refractive index of $n_D^{20.1}=1.4583$.

The term "N,N-dipropyl levulinamide," as used in the specification and claims is to be understood as referring to n-propyl as well as iso-propyl N,N-disubstituted levulinamides.

Having thus described our invention, we claim:

1. An insect repellent composition containing as an essential active ingredient N,N-dipropyl levulinamide, and a non-toxic ointment as a carrier therefor.

2. An insect repellent composition comprising N,N-dipropyl levulinamide in mineral oil.

3. An insect repellent composition comprising N,N-dipropyl levulinamide in petrolatum.

4. A process of repelling insects comprising applying N,N-dipropyl levulinamide to the region from which the insects are to be repelled.

5. A process of repelling insects comprising applying N,N-dipropyl levulinamide to the skin.

NATHAN L. DRAKE.
CHARLES M. EAKER.

REFERENCES CITED

The following references are of record in the file of this patent:

UNITED STATES PATENTS

| Number | Name | Date |
|---|---|---|
| 1,986,854 | Reid | Oct. 24, 1931 |
| 2,166,971 | Schmidt et al. | July 25, 1939 |
| 2,408,389 | Gertler | Oct. 1, 1946 |
| 2,411,720 | Gertler | Nov. 26, 1946 |

OTHER REFERENCES

Haun: "Comptes Rendus," vol. 188, April 29, 1929, pp. 1174.

Haskelberg: "J. Am. Chem. Soc.," vol. 70, August 1948, pp. 2830–2831.

OSRD Insect Control Report No. 28, Interim Report No. O–94, May 18, 1945; particularly pp. 25 (Orlando Nos. O–1183, O–1184), 33 (Orlando Nos. O–4041, O–4042) and 45 (Orlando No. O–3377).